United States Patent Office  3,160,661
Patented Dec. 8, 1964

3,160,661
6-DEOXYTETRACYCLINES
Jerry Robert Daniel McCormick, New City, N.Y., assignor to American Cyanamid Company, New York, N.Y., a corporation of Maine
No Drawing. Filed July 28, 1958, Ser. No. 751,180
8 Claims. (Cl. 260—559)

This application is a continuation-in-part of our copending applications Serial No. 643,218 and Serial No. 643,227 filed March 1, 1957, both of which are abandoned.

This invention relates to 6-deoxytetracyclines, a new family of broad-spectrum antibiotics.

In our copending applications Serial No. 643,218 and Serial No. 643,227 filed March 1, 1957, we have described certain new compounds of the tetracycline family which we have designated 6-deoxytetracyclines. As described therein, this new tetracycline series includes 6-deoxytetracycline, 6-deoxy-4-epi-tetracycline, 5-hydroxy-6-deoxytetracycline, 5-hydroxy-6-deoxy-4-epi-tetracycline, 6-demethyl-6-deoxytetracycline and 6-demethyl-6-deoxy-4-epi-tetracycline. The new 6-deoxytetracyclines are related to the well-known broad-spectrum antibiotic tetracycline and differ essentially therefrom in that the hydroxy group in the 6-position of the tetracycline nucleus has been replaced by a hydrogen atom. This change makes a striking difference in the activity of the resulting compounds, however, in that they not only retain the typical broad-spectrum antibacterial activity of tetracycline but, in addition, appear to be effective against certain tetracycline-resistant strains of bacteria. In addition, certain of the new compounds have a biological activity of one and one-half times that of tetracycline against *Staphylococcus aureus*.

It is most surprising that the 6-deoxytetracyclines retain the typical broad-spectrum antibacterial activity of tetracycline, especially when it is considered that anhydrotetracycline, which also lacks a hydroxy group in the 6-position of the tetracycline nucleus, exhibits a considerably lower order of antibacterial activity than does tetracycline, being only $\frac{1}{10}$ to $\frac{1}{4}$ as active as 6-deoxytetracycline (turbidimetric assay against *S. aureus*.) Moreover, it is wholly unexpected that a compound lacking the methyl and hydroxy groups of tetracycline would be a more active antibacterial agent than tetracycline itself. Thus, it is now known that the antibacterial activity of tetracycline (turbidimetric towards *S. aureus*) is substantially unaltered by replacement of 5—H with OH, of 6—OH with H, of 6—CH$_3$ with H, or of 7—H with Cl or Br.

The replacement of the 6-hydroxyl group of tetracycline, 5-hydroxytetracycline and 6-demethyltetracycline has now been extended to the remaining members of this family of tetracycline antibiotics, namely, 7-chlorotetracycline, 7-bromotetracycline, 7-chloro-6-demethyltetracycline and 7-bromo-6-demethyltetracycline. Thus, the present invention includes in addition to the new compounds referred to hereinbefore, the novel compounds 7-chloro-6-deoxytetracycline, 7-chloro-6-deoxy-4-epi-tetracycline, 7-bromo-6-deoxytetracycline, 7-bromo-6-deoxy-4-epi-tetracycline, 7-chloro-6-demethyl-6-deoxytetracycline, 7-chloro-6-demethyl-6-deoxy-4-epi-tetracycline, 7-bromo-6-demethyl-6-deoxytetracycline and 7-bromo-6-demethyl-6-deoxy-4-epi-tetracycline.

The new 6-deoxytetracyclines of this invention may also be represented by the following general formula:

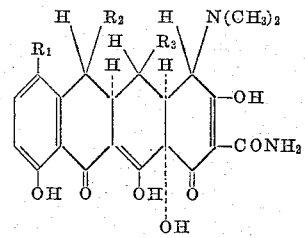

wherein R$_1$ is hydrogen, bromine or chlorine, R$_2$ is hydrogen or methyl, and R$_3$ is hydrogen or hydroxy. As indicated previously, this invention also includes the 4-epimers of the above novel compounds. The present invention also includes the therapeutically active salts and complexes of these amphoteric compounds, e.g., the non-toxic mineral acid salts, the alkali metal salts and the alkaline earth metal salts, as well as various complexes such as those formed with salts of aluminum, magnesium, calcium, etc.

For convenience, the novel compounds of this invention are referred to herein generally as 6-deoxytetracyclines. An appropriate chemical name for the tetracycline analogue of this invention, according to Chemical Abstracts nomenclature, is 4-dimethyl-amino-1,4,4a,5,5a,6,11,12a-octahydro-3,10,12,12a-tetrahydroxy-6-methyl-1,11-dioxo-2-naphthacenecarboxamide. Trivial names will be used, however, throughout the specification and claims in referring to the new compounds of this invention.

One of the more important advantages possessed by the new compounds over the previously described tetracyclines is their increased stability in acids and alkali. The acid instability of tetracycline and the alkali instability of chlortetracycline are well known. Chlortetracycline in an aqueous solution with a sodium carbonate buffer at pH 9.85 loses 50% of its activity in 29.2 minutes at 23° C. By contrast, 6-deoxytetracycline loses no more than one percent of its activity in 24 hours under the same conditions. 6-demethyl-6-deoxytetracycline is equally stable under the same conditions. Tetracycline has a half life of less than one minute in 3 normal hydrochloric acid at 100° C. 6-deoxytetracycline, on the other hand, has a half life of 1600 minutes under the same conditions. 6-demethyl-6-deoxytetracycline also has a half life of 1644 minutes under the same conditions. 5-hydroxy-6-deoxytetracycline under the same conditions has a half life of 2700 minutes. Tetracycline has a half life of less than one minute in 0.1 normal sodium hydroxide solution at 100° C. By contrast, 6-deoxytetracycline has a half life of 380 minutes under the same conditions, 6-demethyl-6-deoxytetracycline has a half life of 200 minutes under the same conditions and 5-hydroxy-6-deoxytetracycline has a half life of 620 minutes under these conditions.

These unexpected properties are very valuable inasmuch as the acid instability of tetracycline and the alkali instability of chlorteracycline has limited or completely precluded the use of thes antibiotics in many applications. By virtue of the much better stability of the new 6-deoxytetracyclines, it is possible to prepare many pharmaceutical products which could not be satisfactorily compounded with the previously known tetracyclines. Also, the increased stability makes it possible to improve the recovery and purification procedures since more drastic pH and temperature conditions may be used without destruction of the new compounds.

As indicated above, the antibacterial activity of the new 6-deoxytetracyclines is substantially unaltered from that of tetracycline and thus the new compounds may be administered by the physician in the same manner and in approximately the same dosages as with the tetracyclines current in use. Moreover, the new 6-deoxytetracyclines, since they show the typical broad-spectrum antibacterial activity of the previously known tetracyclines, may be used in the treatment of various infections produced by both Gram-positive and Gram-negative bacteria where treatment of such infections with tetracycline, chlortetracycline or oxytetracycline is indicated.

The antibacterial spectrum of the new compounds, representing the amount required to inhibit the growth of various typical bacteria, was determined in a standard manner by the agar dilution streak technique which is commonly used in testing new antibiotics. The minimal inhibitory concentrations, expressed in gammas per milliliter of two typical compounds of this invention, namely, 6-deoxytetracycline and 5-hydroxy - 6 - deoxytetracycline against various test organisms is reported in the table below. For comparison purposes, the antibacterial activity of tetracycline against the same organisms is also included.

TABLE 1

| Organism | 5-Hydroxy-6-deoxy-tetracycline | 6-Deoxy-tetracycline | Tetracycline Hydrochloride |
| --- | --- | --- | --- |
| Mycobacterium ranae | 0.2 | 0.2 | 0.4 |
| Mycobacterium smegmatis ATCC 607 | 0.2 | 0.2 | 0.4 |
| Staphylococcus aureus ATCC 6538P (Micrococcus pyogenes var aureus) | 0.2 | 0.8 | 0.4 |
| Sarcina Lutea ATCC 8341 | 0.2 | 0.4 | 0.4 |
| Bacillus subtilis ATCC 6633 | 0.2 | <0.1 | 0.4 |
| Streptococcus hemolyticus, β hemolytic | 0.8 | 0.2 | 6 |
| Streptococcus hemolyticus, γ hemolytic | >50 | 6 | 25 |
| Staphylococcus albus | >50 | 6 | 25 |
| Streptococcus hemolyticus, Group D | >50 | 6 | 25 |
| Staphylococcus aureus | 1.5 | 1.5 | 1.5 |
| Bacillus cereus ATCC 10702 | 1.5 | 1.5 | 0.8 |
| Proteus vulgaris | 12 | 12 | 6 |
| Escherichia coli ATCC 9637 | 12 | 12 | 6 |
| Salmonella gallinarum | 12 | 12 | 6 |

From the above it will be observed that in many respects the antibacterial spectrum of these new 6-deoxytetracyclines closely parallels that of tetracycline, but that in addition 6-deoxytetracycline is effective against certain tetracycline-resistant strains of bacteria such as *Streptococcus hemolyticus, γ hemolytic, Staphylococcus albus,* and *Streptococcus hemolyticus,* Group D. In addition both of these compounds are much more effective against *Streptococcus hemolyticus, β* hemolytic than is tetracycline.

The antibacterial activity of 6-demethyl-6-deoxytetracycline was also determined in the same manner. The minimal inhibitory concentrations, expressed in gammas per milliliter, of 6-demethyl-6-deoxytetracycline against various test organisms is reported in the table below. For comparison purposes, the antibacterial activity of tetracycline against the same organisms is also included.

TABLE 2

| Organism | 6-Demethyl-6-deoxy-tetracycline | Tetracycline Hydrochloride |
| --- | --- | --- |
| Mycobacterum ranae | 0.4 | 0.4 |
| Mycobacterium smegmatis ATCC 607 | 0.4 | 0.4 |
| Micrococcus pyogenes var aureus (Staph. aureus ATCC 6538P) | 0.8 | 0.8 |
| Sacrina lutea ATCC 9341 | 0.8 | 0.8 |
| Bacillus subtilis ATCC 6633 | 0.4 | 0.4 |
| Streptococcus pyogenes | 12.0 | 50.0 |
| Micrococcus pyogenes var albus (Staph. albus) | 12.0 | 50.0 |
| Streptococcus pyogenes, β hemolytic | 12.0 | 50.0 |
| Bacillus cereus ATCC 10702 | 0.8 | 0.2 |
| Proteus vulgaris | 6.0 | 6.0 |
| Salmonella gallinarum | 6.0 | 6.0 |
| Escherichia coli | 6.0 | 6.0 |

From the above it will be observed that in many respects the antibacterial spectrum of 6-demethyl-6-deoxytetracycline closely parallels that of tetracycline, but that in addition the new compound is effective against certain tetracycline-resistant strains of bacteria such as *Streptococcus pyogenes* γ hemolytic, *Micrococcus pyogenes* var. *albus, Streptococcus pyogenes* β hemolytic, etc. as well as having the most important advantage of possessing a biological assay of about one and one-half times that of tetracycline against *Staphylococcus aureus* as measured by the standard turbidimetric assay [Annals of the New York Academy of Sciences, 51, 218 (1948)].

The new 6-deoxytetracyclines are produced by the hydrogenolysis of the corresponding tetracycline. That is, the 6-hydroxyl group of tetracycline, 7-chlorotetracycline, 7-bromotetracycline, 5-hydroxytetracycline, 6-demethyltetracycline, 7-chloro-6-demethyltetracycline and 7-bromo-6-demethyltetracycline is replaced by a hydrogen atom. Tetracycline, 7-chlorotetracycline, 7-bromotetracycline and 5-hydroxytetracycline are, of course, well-known antibiotics whose preparation need not be described herein. 6 - demethyltetracycline, 7-chloro-6-demethyltetracycline and 7-bromo-6-demethyltetracycline as well as their 4-epimers are described in the Journal of American Chemical Society 79, 4561 (1957). These latter compounds also form the subject matter of the copending application of J. R. D. McCormick et al. Serial No. 587,518, filed May 28, 1956, now Patent No. 2,878,289.

The hydrogenolysis reaction is preferably carried out by contacting a polar solvent solution of the corresponding tetracycline with hydrogen in the presence of a noble metal catalyst. Preferably, finely-divided metallic palladium or other metal of the platinum family is used. The pure metal may be used, or more preferably, the catalyst is suspended on one of the common carriers such as finely-divided alumina, activated charcoal, diatomaceous earth, etc. The hydrogenolysis may be carried out at temperatures ranging from about 0° C. to about 100° C. and preferably from about room temperature, that is around 25° C. to about 50° C. and at hydrogen pressures of about one-half to about 100 atmospheres.

The hydrogenolysis is carried out in the presence of a substance which is capable of forming a chelate ring with a peri-dioxygenated hydronaphthalene such as 8-hydroxy-1-tetralone for example. Suitable compounds which possess the property of forming a chelate ring and which may be used successfully in this reduction process are boric acid, boron trihalides such as boron trifluoride, aluminum and magnesium salts such as aluminum chloride, magnesium acetate, etc. Boric acid or boron trihalides appear to be the most useful compounds in terms of yield of desired products. Usually the boric acid or boron trihalide is present in at least mole for mole quantities.

Suitable inert solvents which may be used in the reaction are various polar solvents such as water, dioxane, glacial acetic acid, 2-methoxyethanol, 2-ethoxyethanol, ethyl acetate, etc. A one-to-one ratio of water and dimethylformamide has been found to be a particularly good solvent mixture for this reaction. A small amount of perchloric acid is usually added to the solution.

A concentration of catalyst of at least 5% by weight of the corresponding tetracycline is necessary and up to about 100% by weight may be used. The hydrogenolysis is usually carried out until one mole of hydrogen has been absorbed when tetracycline is the starting material, at which time the rate of absorption tends to diminish. When chlortetracycline or bromtetracycline are used for the preparation of 6-deoxytetracycline, 2 moles of hydrogen are, of course, required. Some caution must be exercised in not continuing the hydrogenation for an undue length of time as further and undesirable reductions may take place with the production of less desirable products.

In order to prepare the new halodeoxytetracyclines of this invention, that is 7-chloro-6-deoxytetracycline, 7-bromo-6-deoxytetracycline, 7-chloro-6-demethyl-6-deoxytetracycline and 7-bromo-6-demethyl-6-deoxytetracycline from the corresponding bromo- or chlorotetracycline it is necessary that the hydrogenolysis reaction be stopped after about one mole of hydrogen has been absorbed, otherwise the 7-chlorine or 7-bromine atom is removed in addition to the 6-hydroxyl group with the result that 6-deoxytetracycline is formed. However, by careful control of the hydrogenation conditions, it is possible to retain the 7-chlorine or 7-bromine atom intact with the result that the new halogenated deoxytetracyclines are formed.

The substances capable of forming a chelate ring as described above which are used in the hydrogenolysis reaction are most important reagents since they apparently act as complexing or chelating agents and serve to prevent the hydrogenation of the oxygen functions at the 11-position and 12-position of the tetracycline ring system. If the 11- or 12-positions of the tetracycline nucleus are hydrogenated in preference to the 6-position, and which invariably occurs in the normal hydrogenation reaction, the resulting compound possesses no antibacterial activity. The use of the chelating agents, however, in accordance with the present invention, serves to tie up these two oxygen functions and prevents their hydrogenation so that the desired antibacterial activity of the resulting compounds is retained.

After the hydrogenolysis has been completed, the 6-deoxytetracycline is recovered by any desired means, as by removal of the catalyst and concentration of the solution. The product is evaporated to dryness, purified by fractional precipitation in methanol, and may be further purified by recrystallization in alcohol in a standard manner. The neutral product so formed may be converted to a mineral acid salt, i.e., the hydrochloride, by treatment with acids such as hydrochloric acid at a pH of less than about 4. Other acid salts such as the sulfate, phosphate, trichloroacetate, oxalate, citrate, gluconate, etc., may be formed in a similar manner. Preferably, the 6-deoxytetracycline is suspended in a suitable solvent during the acidification.

The alkali metal and alkaline earth metal salts may be simply formed by treating the amphoteric compound with approximately one equivalent of the chosen base, i.e. sodium hydroxide, potassium hydroxide, calcium hydroxide, barium hydroxide, etc. The metal salts may be prepared in aqueous solution or in a suitable solvent. Preferably the basic salts are prepared at a pH of 6 or higher. The free base may be obtained at a pH within the range of about 4–6.

The complexes, such as the 6-deoxytetracycline aluminum gluconate complex, for example, may be formed by the simple admixture of the hydrochloride salt of a 6-deoxytetracycline and aluminum gluconate in an aqueous solution. The formation of the new complexes may thus be easily accomplished in substantially the same manner as already known for the preparation of similar complexes with other tetracycline antibiotics, i.e. those described in the U.S. patent to Ritter, No. 2,736,725.

The new antibiotics of this invention also have an epimeric form at carbon atom four of the tetracycline nucleus, the same as has been described in connection with other tetracycline compounds. These new isomers may be formed by simply adjusting the hydrogen ion concentration of a concentrated solution of the normal compound to within the range of pH 3.0 to 5.0 and allowing the solution to stand until the isomerization has come to an equilibrium. The method of preparing the new isomers is analogous to that used in the conversion of the previously known tetracyclines to their epimers. [J.A.C.S. 79, 2849 (1957).]

The isomerization is most conveniently carried out at room temperature, although a higher rate of conversion takes place at higher temperatures. The pH should be within the range of about 3.0 to 5.0, preferably between 3.5 and 4.5. Some epimerization will take place at hydrogen ion concentrations outside these ranges and even in distilled water; but the rate is very slow. The concentration of the antibiotic in the aqueous solution should be as high as possible in order to obtain the faster rates of epimerization. Complete equilibration may require a period of time of about 24 hours at 25° C., but satisfactory equilibration may require a considerably shorter time under specific conditions. Ordinarily, however, best results are obtained by allowing the solutions to stand for periods of time of one week or more. An equilibrium appears to be reached in most cases at about 50 percent; that is, about half of the antibiotic is converted to the epimer at equilibrium.

Inasmuch as concentration is an important factor in obtaining high yields in short periods of time, a solvent system should be selected which will give the highest concentration of the antibiotic. These solvent systems should be buffered to obtain a pH within the preferred range. Various solvents include methanol, ethanol, butanol, acetone, 2-ethoxyethanol, 2-methoxypropanol, glacial acetic acid, tetrahydrofuran, dimethylformamide and mixtures of these solvents. Still other solvents may be used. A preferred buffering agent is sodium dihydrogen phosphate, although other buffers and buffer pairs may be used which will maintain the hydrogen ion concentration within the desired range.

It is also possible to prepare the new 6-deoxy-4-epi-tetracyclines of this invention by the catalytic reduction of the corresponding 4-epi-tetracycline. The 4-epi-tetracyclines are described in J.A.C.S. 79, 2849 (1957). In this aspect of the present invention, the hydrogenolysis reaction in the presence of the chelating agent is carried out on a 4-epi-tetracycline in exactly the same manner as has been previously described in connection with the hydrogenolysis of tetracycyline. At the completion of the hydrogenation the corresponding 6-deoxy-4-epi-tetracycline is formed.

The invention will be described in greater detail in conjunction with the following specific examples.

*Example 1*

PREPARATION OF 6-DEOXYTETRACYCLINE

Twelve grams of tetracycline hydrochloride are suspended in 10 volumes of a 1 to 1 mixture of water and dimethylformamide. To the mixture is added 1.48 grams of boric acid, 12 grams of unreduced 5% palladium on carbon and 0.5 milliliter of perchloric acid. Hydrogenation is carried out by reaction with hydrogen at about 40 p.s.i. on a Parr shaker for approximately 2½ hours. The hydrogenation is terminated after about 1 mole of hydrogen has been absorbed. The solution is filtered and the catalyst is washed with 10 milliliters of dimethylformamide and then a second wash with 10 milliliters of water.

The filtrate is adjusted to pH 3.0 with concentrated ammonium hydroxide and evaporated to dryness in vacuo. Fifty milliliters of water-saturated butanol are added and the mixture is stirred and filtered. The activity is concentrated into water and the pH is adjusted to 3.0 and filtered. The filtrate is adjusted to pH 1.5 and back-extracted with 100 milliliters of butanol. The butanol extract is concentrated to approximately 5–10 milliliters in an atmosphere of nitrogen. The solution is seeded and aged for 18 hours at room temperature. The crystals are filtered, washed with acetone and then with ether and dried in vacuo at 40° C. for 20 hours to obtain 179 milligrams of 6-deoxy-tetracycline hydrochloride.

Example 2

PREPARATION OF 6-DEOXYTETRACYCLINE HYDROCHLORIDE

Two-thirds of a gram of 6-deoxytetracycline are slurried in 13.5 milliliters of ethyl alcohol. 0.5 milliliter of concentrated hydrochloric acid is added to adjust the pH to 0.8 to 1.0. The solution is aged for 3½ hours. The 6-deoxytetracycline hydrochloride crystals which are formed are dried in vacuo at 100° C. for 20 hours.

*Analysis.*—Calculated for $C_{22}H_{25}N_2ClO_7$: C, 56.7; H, 5.38; N, 6.02; Cl, 7.69; O, 24.1. Found: C, 56.52; H, 5.46; N, 5.94; Cl, 7.71; O, 23.89.

The product has an optical rotation $[\alpha]_D^{25} = -254°$ in 0.1 N $H_2SO_4$. An ultraviolet absorption spectrum is determined from a sample of the purified compound in 0.1 N $H_2SO_4$ at a concentration of 30.65 gammas per milliliter. An infrared absorption spectrum is determined from a sample of the compound mixed with crystals of KBr and pressed into a disc.

Example 3

PREPARATION OF 5-HYDROXY-6-DEOXYTETRACYCLINE

The procedure of Example 1 is repeated with the sole exception that 12 grams of oxytetracycline are used as the starting material instead of the tetracycline hydrochloride used therein.

To the reduction solution so-obtained there is added 5 grams of diatomaceous earth (Hyflo) and the mixture is filtered. The cake is washed with 50 milliliters of a 50–50 mixture of dimethylformamide and water. The filtrate and washings are combined to give a volume of 168 milliliters. The pH of the combined washings and filtrate is adjusted to 3.0 with concentrated ammonium hydroxide and the solution is evaporated to dryness in vacuo at 40–60° C. The solids are extracted with 75 milliliters of water for one hour with agitation. The slurry is filtered. The pH of the solution is adjusted to 1.0 with hydrochloric acid. The activity is twice extracted into butanol. The butanol extracts are combined and evaporated to dryness. 7 milliliters of acetone are added to the dried butanol extract and hydrochloric acid is added to adjust the pH to 1.0. The solids are removed by centrifugation. The supernatant is seeded and the crystals which are formed are aged for 6 hours, filtered and washed with acetone and then with ether. The crystals are dried in vacuo at 40° C. for 12 hours. Yield 84.7 milligrams of 5-hydroxy-6-deoxytetracycline.

*Analysis.*—Calculated for $C_{22}H_{25}N_2ClO_8$: C, 54.90; H, 5.20; N, 5.83; Cl, 7.38; O, 26.70. Found: C, 54.48; H, 4.81; N, 5.50; Cl, 7.74; O, 26.55.

The product has an optical rotation $[\alpha]_D^{25} = -251°$ in 0.1 N $H_2SO_4$. An ultraviolet absorption spectrum is determined from a sample of the compound in 0.1 N $H_2SO_4$ at a concentration of 40.76 gammas per milliliter. An infrared absorption spectrum is determined from a sample of the compound mixed with crystals of KBr and pressed into a disc.

Example 4

PREPARATION OF 6-DEOXYTETRACYCLINE

To 1.0 gram of tetracycline hydrochloride are added 25 milliliters of a 1 to 1 mixture of dimethylformamide and water. 3 milliliters (10 molar equivalents) of 45% boron trifluoride-ether is added and the pH is adjusted to 1.3 with 2 milliliters of triethylamine. 1.0 gram of 5% palladium on carbon is added and the mixture is placed on a Parr shaker and allowed to react with hydrogen for 100 minutes (hydrogen uptake is 1 mole). The mixture is filtered and the insolubles are rinsed with 10 milliliters of water. 6-deoxytetracycline is produced.

Example 5

PREPARATION OF 6-DEOXYTETRACYCLINE

To 2.5 grams of tetracycline hydrochloride are added 25 milliliters of a 1 to 1 mixture of dimethylformamide and water. 1.1 grams of magnesium acetate

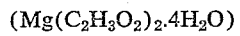

$$(Mg(C_2H_3O_2)_2 \cdot 4H_2O)$$

are added. The pH is adjusted to 1.8 with hydrochloric acid. 2.5 grams of 5% palladium on carbon, and 2 drops of perchloric acid are added and the mixture placed on a Parr shaker and allowed to react with hydrogen for 71 minutes (hydrogen uptake is 1 mole). The reduced solution is filtered and the insolubles rinsed with 0.1 N hydrochloric acid. 6-deoxytetracycline is produced.

Example 6

PREPARATION OF 6-DEOXYTETRACYCLINE

To 2.5 grams of tetracycline hydrochloride are added 25 milliliters of a 1 to 1 mixture of dimethylformamide and water. The pH is adjusted to 1.8 with hydrochloric acid. 0.55 gram of calcium chloride, 2 drops of perchloric acid, and 2.5 grams of 5% palladium on carbon are added. The mixture is placed on a Parr shaker and allowed to react with hydrogen for 97 minutes (uptake of 1 mole of $H_2$). The mixture is filtered and rinsed with 5 milliliters of 0.1 N hydrochloric acid. 6-deoxytetracycline is produced.

Example 7

PREPARATION OF 6-DEOXYTETRACYCLINE

To 1 gram of tetracycline hydrochloride are added 25 milliliters of a 1 to 1 mixture of dimethylformamide and water containing 0.27 gram of aluminum chloride. The pH is adjusted to 1.5 perchloric acid. 1.0 gram of 5% palladium on carbon is added and the mixture is placed on a Parr shaker for 150 minutes (Uptake of 1 mole of $H_2$). The mixture is filtered. 6-deoxytetracycline is produced.

Example 8

PREPARATION OF DEOXY-4-EPI-TETRACYCLINE

To 5 milligrams of 6-deoxytetracycline is added 1 milliliter of glacial acetic acid. The mixture is shaken and allowed to equilibrate at room temperature for 18 hours and then filtered. Paper strip chromatography shows the presence of 6-deoxy-4-epi-tetracycline.

Example 9

PREPARATION OF 5-HYDROXY-6-DEOXY-4-EPI-TETRACYCLINE

To 5 milligrams of 5-hydroxy-6-deoxytetracycline is added 1 milliliter of glacial acetic acid. The mixture is shaken and allowed to equilibrate at room temperature for 18 hours and then filtered. Paper strip chromatography shows the presence of 5-hydroxy-6-deoxy-4-epi-tetracycline.

Example 10

PREPARATION OF 6-DEOXYTETRACYCLINE

To 1.0 gram of tetracycline hydrochloride is added 0.13 gram of boric acid, dissolved in 28 milliliters of a 1 to 1 mixture of dimethylformamide and water. The pH is adjusted to 2.1 with hydrochloric acid. To 13 milliliters of this solution is added 0.75 gram of 5% palladium on carbon. The mixture is placed into a stainless steel bomb and allowed to react with hydrogen at 1900 pounds pressure for 80 minutes. The mixture is filtered and the insolubles are washed with water. Spectrophotometric assays on the reduction filtrate indicate the presence of 6-deoxytetracycline.

*Example 11*

PREPARATION OF 6-DEOXYTETRACYCLINE

The procedure of Example 1 is followed except that chlortetracycline hydrochloride is used as the starting material instead of the tetracycline hydrochloride used therein. The chlortetracycline hydrochloride is added to 15 milliliters of a 50:50 mixture of dimethylformamide and water and the hydrogenation is carried out as in Example 1 until two moles of hydrogen have been absorbed. Chromatographic examination of the product shows the presence of 6-deoxytetracycline.

*Example 12*

PREPARATION OF 5-HYDROXY-6-DEOXY-4-EPI-TETRACYCLINE

To 4 milliliters of a solvent solution prepared by mixing 25 milliliters of dimethylformamide, 25 milliliters of water, 32.5 milligrams of boric acid and one drop of perchloric acid are added 5.67 milligrams of 5-hydroxy-4-epi-tetracycline neutral [J.A.C.S. 79, 2849 (1957)]. Seven milligrams of 5% palladium on carbon are added and the mixture is contacted with hydrogen at 30 pounds pressure for six hours. Paper chromatographic and spectrophotometric analyses show the presence of 5-hydroxy-6-deoxy-4-epi-tetracycline.

*Example 13*

PREPARATION OF 6-DEOXY-4-EPI-TETRACYCLINE

To 4 milliliters of a solvent solution prepared by mixing 25 milliliters of dimethylformamide, 25 milliliters of water, 32.5 milligrams of boric acid and one drop of perchloric acid are added 5.0 milligrams of 7-bromo-4-epi-tetracycline ammonium salt [J.A.C.S. 79, 2849 (1957)]. Seven milligrams of 5% palladium on carbon are added and the mixture is contacted with hydrogen at 30 pounds pressure for six hours. Paper chromatographic and spectrophotometric analyses show the presence of 6-deoxy-4-epi-tetracycline.

*Example 14*

PREPARATION OF 6-DEOXY-4-EPI-TETRACYCLINE

To 4 milliliters of a solvent solution prepared by mixing 25 milliliters of dimethylformamide, 25 milliliters of water, 32.5 milligrams of boric acid and one drop of perchloric acid are added 5.0 milligrams of 7-chloro-4-epi-tetracycline hydrochloride [J.A.C.S. 79, 2849 (1957)]. Seven milligrams of 5% palladium on carbon are added and the mixture is contacted with hydrogen at 30 pounds pressure for seven hours. Paper chromatographic and spectrophotometric analyses show the presence of 6-deoxy-4-epi-tetracycline.

*Example 15*

PREPARATION OF 6-DEOXYTETRACYCLINE

To 4 milliliters of a solvent solution prepared by mixing 25 milliliters of dimethylformamide, 25 milliliters of water, 32.5 milligrams of boric acid and one drop of perchloric acid are added 6.0 milligrams of 7-bromotetracycline. Seven milligrams of 5% palladium on carbon are added and the mixture is contacted with hydrogen at 30 pounds pressure for six hours. Paper chromatographic and spectrophotometric analyses show the presence of 6-deoxytetracycline.

*Example 16*

PREPARATION OF 6-DEOXY-4-EPI-TETRACYCLINE

To 4 milliliters of a solvent solution prepared by mixing 25 milliliters of dimethylformamide, 25 milliliters of water, 32.5 milligrams of boric acid and one drop of perchloric acid are added 5.0 milligrams of 4-epi-tetracycline [J.A.C.S. 79, 2849 (1957)]. Seven milligrams of 5% palladium on carbon are added and the mixture is contacted with hydrogen at 30 pounds pressure for four hours. Paper chromatographic and spectrophotometric analyses show the presence of 6-deoxy-4-epi-tetracycline.

*Example 17*

PREPARATION OF 7-CHLORO-6-DEOXYTETRACYCLINE

To 250 milliliters of a solvent solution prepared by mixing 125 milliliters of dimethylformamide, 125 milliliters of water and 1.5 grams of boric acid are added 10 grams of 7-chlorotetracycline, 5 grams of activated charcoal and 5 grams of rhodium chloride. The mixture is contacted with hydrogen at 40 pounds pressure by shaking for four hours. The mixture is filtered and the filtrate is shown to contain each of 7-chloro-6-deoxytetracycline, 6-deoxytetracycline, tetracycline and 7-chlorotetracycline. The mixture is separated by preparative paper chromatography to yield pure 7-chloro-6-deoxytetracycline.

*Example 18*

PREPARATION OF 7-BROMO-6-DEOXYTETRACYCLINE

Example 17 is repeated, substituting 7-bromo-tetracycline for 7-chlorotetracycline. A mixture containing the expected 7-bromo-6-deoxytetracycline is produced. 7-bromo-6-deoxytetracycline is separated by preparative paper chromatography.

*Example 19*

PREPARATION OF 7-CHLORO-6-DEOXY-4-EPI-TETRACYCLINE 7-chloro-6-deoxytetracycline from Example 17 is added to one milliliter of glacial acetic acid. The mixture is shaken and allowed to equilibrate at room temperature for 18 hours.

*Example 20*

PREPARATION OF 7-BROMO-6-DEOXY-4-EPI-TETRACYCLINE 7-bromo-6-deoxytetracycline from Example 18 is added to one milliliter of glacial acetic acid. The mixture is shaken and allowed to equilibrate at room temperature for 18 hours.

*Example 21*

PREPARATION OF 6-DEMETHYL-6-DEOXYTETRACYCLINE

Twelve grams of 6-demethyltetracycline neutral [J.A.C.S. 79, 4561 (1957)] are suspended in 10 volumes of a 1 to 1 mixture of water and dimethylformamide. The hydrochloride salt thereof is prepared by treatment with concentrated hydrochloric acid at a pH of 1.8. To the mixture is added 1.48 grams of boric acid, 12 grams of unreduced 5% palladium on carbon and 0.03 milliliter of perchloric acid. Hydrogenation is carried out by reaction with hydrogen at about 20 p.s.i. on a Parr shaker for approximately 2 hours. The hydrogenation is terminated after about 1 mole of hydrogen has been absorbed. The solution is filtered and the catalyst is washed with 10 milliliters of dimethylformamide and then a second wash with 10 milliliters of water.

The filtrate is evaporated to dryness. Fifty milliliters of water are added and the mixture is stirred and freeze-dried. The dried material is slurried in 100 milliliters of methanol and then centrifuged. To 88 milliliters of the methanol solution is added 88 milliliters of ether. A precipitate is formed and is centrifuged. The supernatant consisting of a 1 to 1 methanol and ether solution and having a volume of 130 milliliters is evaporated to ⅓ of its volume. 0.5 milliliter of concentrated hydrochloric acid is added and the solution is evaporated to 5.5 milliliters in an atmosphere of nitrogen. The solution is seeded and aged for 18 hours at room temperature. The crystals are filtered, washed with acetone and then with ether and dried in vacuo at 40° C. for 20 hours to obtain 0.675 gram of 6-demethyl-6-deoxytetracycline.

Example 22

PREPARATION OF 6-DEMETHYL-6-DEOXYTETRACYCLINE NEUTRAL

To 1.36 grams of crude 6-demethyl-6-deoxytetracycline, produced as described in Example 21, are added 196 milliliters of water and the pH is adjusted to 1.2 with hydrochloric acid and the product is filtered. The pH of the filtrate is adjusted to pH 2.75 with ammonium hydroxide, and washed 3 times with 200 milliliters of ether. The washed solution is concentrated under reduced pressure at 40 to 50° C. to a volume of 50 milliliters. The pH is adjusted to 4.5 with ammonium hydroxide, and crystals of neutral 6-demethyl-6-deoxytetracycline are formed. The crystals are aged, filtered, washed with water and dried in vacuo at 40° C. for 23 hours. Yield 0.710 gram.

Example 23

PREPARATION OF 6-DEMETHYL-6-DEOXYTETRACYCLINE HYDROCHLORIDE

Two-thirds of a gram of 6-demethyl-6-deoxytetracycline are slurried in 13.5 milliliters of ethyl alcohol. 0.5 milliliter of concentrated hydrochloric acid is added to adjust the pH to 0.8 to 1.0. The solution is aged for 3½ hours. The 6-demethyl-6-deoxytetracycline hydrochloride crystals which are formed are dried in vacuo at 100° C. for 20 hours. The product has a melting point of 215–220° C. with decomposition.

*Analysis.*—Calculated for $C_{21}H_{22}N_2O_7 \cdot HCl \cdot 1/2H_2O$, molecular weight 459.5: C, 54.9; H, 5.26; N, 6.10; Cl, 7.72; O, 26.1; $1/2H_2O$, 19.6. Found: C, 54.81; H, 5.32; N, 6.16; Cl, 7.80; O, 25.91 (by difference); $H_2O$, 2.06. Neutralization equivalent 477.

The product has an optical rotation $[\alpha]_D^{25} = -109.0$ (in 0.1 normal $H_2SO_4$ solution). An ultraviolet absorption spectrum is determined from a sample of the compound in 0.1 N sulfuric acid at a concentration of 30.65 gammas per milliliter (w./v.). An infrared absorption spectrum is determined from a sample of the compound mixed with crystals of KBr and pressed into a disc.

Example 24

PREPARATION OF 6-DEMETHYL-6-DEOXYTETRACYCLINE

To 1 gram of 6-demethyltetracycline neutral [J.A.C.S. 79, 4561 (1957)] are added 25 milliliters of a 1 to 1 mixture of dimethylformamide and water, and 3 milliliters (10 molar equivalents) of a 45% boron trifluoride-ether solution. The pH is adjusted to 1.5 with triethylamine. 1 grams of 5% palladium on carbon is added and the mixture is placed on a Parr shaker and allowed to react with hydrogen for 150 minutes (hydrogen uptake is 1 mole). The reduced solution is filtered and the insolubles washed with 3 milliliters of water. Yield of 6-demethyl-6-deoxytetracycline is about 26%.

Example 25

PREPARATION OF 6-DEMETHYL-6-DEOXYTETRACYCLINE

The procedure of Example 24 is repeated except that 1.1 grams of magnesium acetate $Mg(C_2H_3O_2)_2 \cdot 4H_2O$ are used instead of the boron trifluoride used therein. 6-demethyl-6-deoxytetracycline is produced.

Example 26

PREPARATION OF 6-DEMETHYL-6-DEOXYTETRACYCLINE

The procedure of Example 24 is repeated except that 0.55 gram of calcium chloride are used instead of the boron trifluoride used therein. 6-demethyl-6-deoxytetracycline is produced.

Example 27

PREPARATION OF 6-DEMETHYL-6-DEOXYTETRACYCLINE

The procedure of Example 24 is repeated except that 0.27 gram of aluminum chloride are used instead of the boron trifluoride used therein. 6-demethyl-6-deoxytetracycline is produced.

Example 28

PREPARATION OF 6-DEMETHYL-6-DEOXYTETRACYCLINE

To 1.0 gram of 6-demethyltetracycline neutral [J.A.C.S. 79, 4561 (1957)] are added 0.13 gram of boric acid, dissolved in 28 milliliters of a 1 to 1 mixture of dimethylformamide and water. The pH is adjusted to 2.1 with hydrochloric acid. To 13 milliliters of this solution is added 0.75 gram of 5% palladium on carbon. The mixture is placed into a stainless steel bomb and allowed to react with hydrogen at 1900 pounds pressure for 80 minutes. The mixture is filtered and the insolubles are washed with water. Spectrophotometric assays on the reduction filtrate indicate the presence of 6-demethyl-6-deoxytetracycline.

Example 29

PREPARATION OF 6-DEMETHYL-6-DEOXY-4-EPI-TETRACYCLINE

To 5 milligrams of 6-demethyl-6-deoxytetracycline is added 1 milliliter of glacial acetic acid. The mixture is shaken well and allowed to equilibrate at room temperature for 18 hours and then filtered. Paper strip chromatography indicates the presence of 6-demethyl-6-deoxy-4-epi-tetracycline by the following Rf values.

Rf values in an ethyl acetate-pH 4.5 system are as follows:

6-demethyl-6-deoxytetracycline—$Rf = 0.75$
6-demethyl-6-deoxy-4-epi-tetracycline—$Rf = 0.44$

Example 30

PREPARATION OF 6-DEMETHYL-6-DEOXYTETRACYCLINE

To 12 grams of 7-chloro-6-demethyltetracycline hydrochloride [J.A.C.S. 79, 4561 (1957)] are added 120 milliliters of a 1:1 mixture of dimethylformamide and water. The pH is adjusted to 1.8 with concentrated hydrochloric acid, 1.48 grams of boric acid and 10 drops of perchloric acid are added. 12 grams of 5% palladium on carbon are added to the mixture and reacted with hydrogen on a Parr shaker for 300 minutes until 2 moles of hydrogen are taken up. The mixture is filtered and the insolubles rinsed with water and dimethylformamide. The product is isolated and recrystallized to produce 6-demethyl-6-deoxytetracycline.

Example 31

PREPARATION OF 6-DEMETHYL-6-DEOXY-4-EPI-TETRACYCLINE

To 4 milliliters of a solvent solution obtained by mixing 25 milliliters of dimethylformamide, 25 milliliters of water, 32.5 milligrams of boric acid and 1 cc. of perchloric acid there are added 5.51 milligrams of 6-demethyl-4-epi-tetracycline hydrochloride [J.A.C.S. 79, 4561 (1957)] and 7 milligrams of 5% palladium on carbon. The mixture is reacted with hydrogen at 30 pounds pressure for two hours. The mixture is filtered and the insolubles are washed with water. Spectrophotometric analysis and paper chromatography indicate the presence of 6-demethyl-6-deoxy-4-epi-tetracycline.

Example 32

PREPARATION OF 6-DEMETHYL-6-DEOXY-4-EPI-TETRACYCLINE

To 4 milliliters of a solvent solution obtained by mixing 25 milliliters of dimethylformamide, 25 milliliters of water, 32.5 milligrams of boric acid and 1 cc. of perchloric acid there are added 5 milligrams of 7-chloro-6-demethyl-4-epi-tetracycline [J.A.C.S. 79, 4561 (1957)]. 7 milligrams of 5% palladium on carbon are added and the mixture is reacted with hydrogen at 30 pounds pressure for four hours. The mixture is filtered and the insolubles washed with water. Paper chromatography

Example 33
PREPARATION OF 7-CHLORO-6-DEMETHYL-6-DEOXYTETRACYCLINE

To 250 milliliters of a 1:1 mixture of dimethylformamide and water there is added 2.5 grams calcium chloride, 10 grams of 7 - chloro-6-demethyltetracycline [J.A.C.S. 79, 4561 (1957)] and 7 grams of 40% rhodium-on-carbon hydrogenation catalyst. The mixture is contacted with hydrogen at 30 pounds pressure for 3 hours and then filtered. The filtrate is evaporated to a syrup and the syrup taken up in water and freeze-dried. The freeze-dried solid is dissolved in 25 milliliters water, the solution saturated with sodium chloride, and extracted with butanol. The butanol extracts are charged to a 6" chromatographic column packed with diatomaceous earth and wet with 0.01 N aqueous hydrochloric acid. The column is developed with 20:80 chloroform:n-butanol which is shaken with an equal volume of 0.01 N hydrochloric acid and the eluate is collected in fractions. The fractions are assayed by paper chromatography and those fractions that contain 7-chloro-6-demethyl-6-deoxytetracycline are combined. The 7-chloro-6-demethyl-6-deoxytetracycline is isolated by concentration and crystallization and its identity shown by catalytic hydrogenolysis in alkaline ethylene glycol-monoethyl ether to form 6-demethyl-6-deoxytetracycline and chloride ion.

Example 34
PREPARATION OF 7-BROMO-6-DEMETHYL-6-DEOXYTETRACYCLINE

Example 33 is repeated substituting 7-bromo-6-demethyltetracycline for 7-chloro-6-demethyltetracycline. The product is 7-bromo-6-demethyl-6-deoxytetracycline.

Example 35
PREPARATION OF 7-CHLORO-6-DEMETHYL-6-DEOXY-4-EPI-TETRACYCLINE 7-chloro-6-demethyl-6-deoxytetracycline from Example 33 is added to one milliliter of glacial acetic acid. The mixture is shaken and allowed to equilibrate at room temperature.

Example 36
PREPARATION OF 7-BROMO-6-DEMETHYL-6-DEOXY-4-EPI-TETRACYCLINE 7-bromo-6-demethyl-6-deoxytetracycline from Example 34 is added to 1 milliliter of glacial acetic acid. The mixture is shaken and allowed to equilibrate at room temperature.

I claim:

1. A compound selected from the group consisting of 6-deoxytetracyclines of the formula:

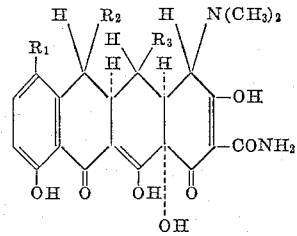

wherein $R_1$ is a member of the group consisting of hydrogen, bromine and chlorine, $R_2$ is a member of the group consisting of hydrogen and methyl, and $R_3$ is a member of the group consisting of hydrogen and hydroxy, the mineral acid salts thereof, the alkali metal salts thereof, and the alkaline earth metal salts thereof.

2. 6-deoxytetracycline.
3. 7-chloro-6-deoxytetracycline.
4. 7-bromo-6-deoxytetracycline.
5. 5-hydroxy-6-deoxytetracycline.
6. 7-chloro-6-demethyl-6-deoxytetracycline.
7. 7-bromo-6-demethyl-6-deoxytetracycline.
8. 6-demethyl-6-deoxytetracycline.

References Cited by the Examiner
UNITED STATES PATENTS

| | | | |
|---|---|---|---|
| 2,712,517 | 7/55 | Gourevitch | 260—559 |
| 2,731,497 | 1/56 | McCormick | 260—559 |
| 2,744,932 | 5/56 | Waller | 260—559 |
| 2,786,077 | 3/57 | Stephens | 260—559 |

FOREIGN PATENTS

| | | |
|---|---|---|
| 167,750 | 5/56 | Australia. |
| 500,955 | 3/54 | Canada. |
| 523,640 | 2/54 | Belgium. |
| 525,518 | 1/54 | Belgium. |
| 747,779 | 4/56 | Great Britain. |

OTHER REFERENCES

Boothe: J. Am. Chem. Soc., vol. 75, p. 4621 (1953).
Doerschuk: J. Am. Chem. Soc., vol. 77, page 4687 (1955).

IRVING MARCUS, *Primary Examiner.*
D. T. McCUTCHEN, *Examiner.*